United States Patent [19]
Nilsson et al.

[11] Patent Number: 5,373,193
[45] Date of Patent: Dec. 13, 1994

[54] SAFETY ARRANGEMENT

[75] Inventors: Stig-Hakan Nilsson, Torshalla; Hans R. Rosen, Eskilstuna, both of Sweden

[73] Assignee: General Engineering (Netherlands) B.V., Utrecht, Netherlands

[21] Appl. No.: 918,226

[22] Filed: Jul. 24, 1992

[30] Foreign Application Priority Data

Jul. 25, 1991 [GB] United Kingdom ............... 9116124

[51] Int. Cl.⁵ ..................... B60R 21/32; H02H 5/00
[52] U.S. Cl. ................................ 307/10.1; 307/121; 280/735
[58] Field of Search ............ 307/9.1, 10.1, 121; 340/436–438; 180/274, 281, 282, 286; 280/735; 364/424.03, 424.05

[56] References Cited

U.S. PATENT DOCUMENTS

| | | |
|---|---|---|
| 4,287,431 | 9/1981 | Yasui et al. |
| 4,366,465 | 12/1982 | Veneziano |
| 4,608,501 | 8/1986 | Andres et al. |
| 4,673,912 | 6/1987 | Kumasaka et al. |
| 4,851,705 | 7/1989 | Musser et al. ........................ 307/10.1 |
| 4,893,109 | 1/1990 | Vrabel et al. ..................... 307/10.1 X |
| 4,950,914 | 8/1990 | Kurihara et al. ..................... 307/10.1 |
| 4,968,965 | 11/1990 | Naitou et al. ....................... 340/346 |
| 5,134,306 | 7/1992 | Schumacher et al. ............. 307/10.1 |

FOREIGN PATENT DOCUMENTS

0357225 7/1990 European Pat. Off.

*Primary Examiner*—A. D. Pellinen
*Assistant Examiner*—Fritz M. Fleming
*Attorney, Agent, or Firm*—Spencer, Frank & Schneider

[57] ABSTRACT

A safety arrangement for an ignition circuit for an airbag comprising a series connection between two switches and an ignition squib between a power supply and earth. A potential derived from a predetermined point in the series connection is monitored by a central processing unit and by a comparator which compares the monitored potential with a reference potential. When the monitored potential exceeds predetermined limits, both the central processor unit and the comparator operate to disable the power supply.

12 Claims, 7 Drawing Sheets

SAFETY ARRANGEMENT

BACKGROUND TO THE INVENTION

1. Field of the Invention

The present invention relates to a safety arrangement and more particularly relates to a safety arrangement incorporated with an air-bag ignition circuit.

2. Description of the Related Art

It has been proposed previously to provide an air-bag ignition circuit adapted to provide electrical power to a "squib" or igniter which activates a pyrotechnic charge within the air-bag to inflate the air-bag.

It is important that the "squib" or igniter is not inadvertently activated, but equally it is important that the "igniter" or squib is activated in accident situations.

It has been proposed, therefore, to connect the "squib" or igniter in a series connection between a power supply rail and earth with two separate switches. One switch is termed a "safing sensor". This switch is adapted to close when subjected to a deceleration force in excess of a predetermined level, which is selected to be a relatively low level, but only after a predetermined period of time has elapsed. A second switch, which may be a transistor switch and which may be termed an igniting transistor is provided which is activated by a sensor, the sensor responding to a high level of deceleration. It is thus apparent that the circuit is only completed when both of the switches are closed.

With the circuit arrangement of this type it is possible for a central processing unit to monitor the condition of the switches, but such monitoring may be subject to software error and is not totally reliable.

The present invention seeks to provide an improved arrangement.

BRIEF SUMMARY OF THE INVENTION

According to this invention there is provided an ignition circuit for an air-bag, the ignition circuit comprising a series connection between two switches and an igniting squib between a power supply and earth, and a processing unit performing a triggering and/or monitoring function, the ignition circuit also incorporating a safety device which is additional to the processing unit and which includes means adapted to disable or disconnect the power supply, the means being connected to at least one point in the series connection between the two switches and including means to derive a potential from the series connection, and means to compare that potential with a reference potential in a comparator and means, responsive to the comparison, to disable or disconnect the power supply.

Preferably two comparators are provided, each with an associated reference voltage, one comparator being adapted to provide an output when one switch is conductive and the other comparator being adapted to provide an output when the other switch is conductive.

Advantageously the output(s) of one or both comparators is fed to a switching transistor, the controlled current path which is connected between the said power supply and earth, the transistor being adapted to disable the power supply when the controlled current path of the transistor is conductive.

Preferably the central processor unit monitors a potential derived from the series connection to disable the ignition circuit if the potential exceeds predetermined limits.

BRIEF DESCRIPTION OF THE DRAWINGS

In order that the invention may be more readily understood, and so that further features thereof may be appreciated, the invention will now be described, by way of example, with reference to the accompanying drawings in which.

DESCRIPTION OF PREFERRED EMBODIMENTS

Figure 1:
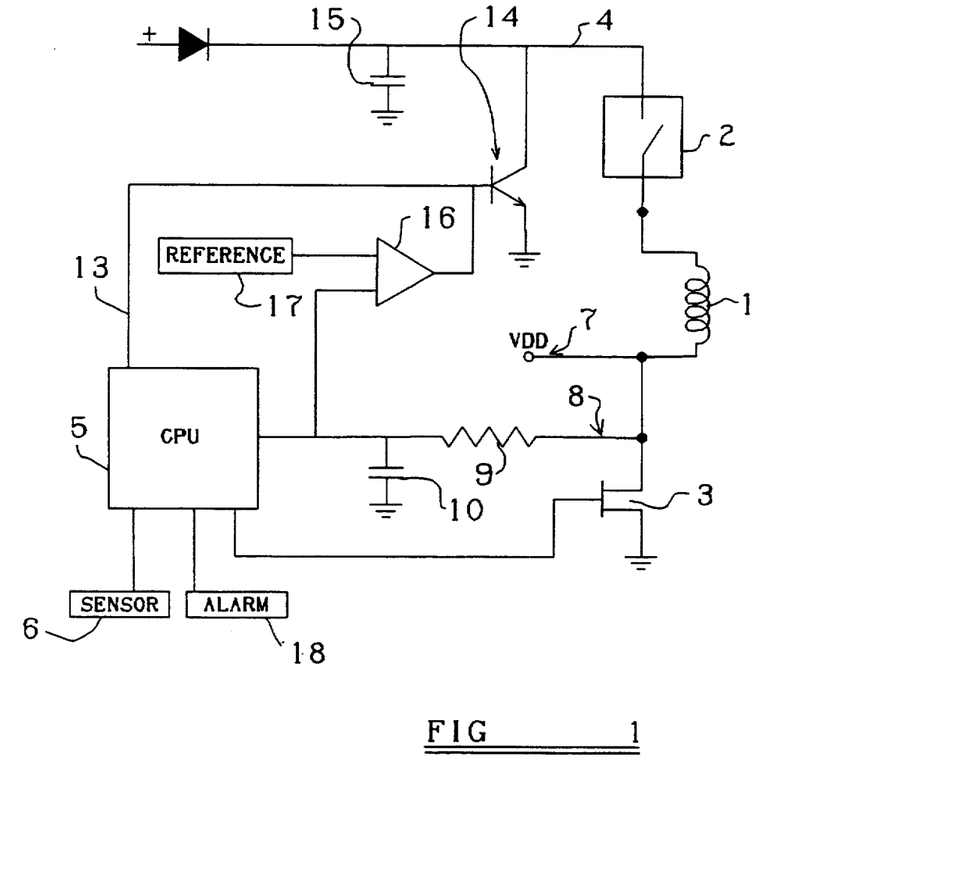
FIG. 1 is a circuit diagram, partly in the form of a block circuit diagram, of a safety arrangement in accordance with the invention.

Referring initially to FIG. 1 of the accompanying drawings an igniter or "squib" 1 for an air-bag is connected in series with a safing sensor switch 2 and a switch in the form of an igniting transistor 3 between a positive supply rail 4 which is supplied with, for example, a 12 volt potential through a diode, and earth. In the embodiment illustrated the safing sensor is connected to the positive rail, and the "squib" 1 is connected between the safing sensor and the igniting transistor 3.

The safing sensor is a switch of known design adapted to close when subjected to a low deceleration or "G" force for a predetermined period of time. The switch may be mechanical or electronic.

The igniting transistor is illustrated as a field effect transistor and is adapted to be triggered by a central processor unit 5 which is associated with a deceleration sensor 6.

The Switch 2 and the igniting transistor 3 will both be conductive under accident conditions thus permitting a current to flow through the squib 1 activating the gas generator for the air-bag.

In order to monitor the condition of the igniting transistor 3, a potential Vdd of, say, 5 volts from a source 7 is applied to the series connection incorporating the two switches and the squib at a position between the two switches. In this embodiment the voltage source 7 is connected to a node between the squib 1 and the igniting transistor 3. A further lead 8 is also connected to the series connection of the switches and the squib, in this embodiment at a point between the squib 1 and the igniting transistor 3. This lead 8 is connected to a delay circuit constituted by a resistor 9 connected in series and a transistor 10 connected to earth forming a "RC" network. The resistor 9 is also connected to an input of the central processor unit 5.

An output 13 of the central processor unit 5 extends to the base of a transistor 14 which has its controlled current path connected between the positive rail 4 and earth or ground. A stabilising and reserve energy storing capacitance 15 is also provided connected between the positive rail 4 and earth (ground).

A comparator 16 is provided having one input connected to the node between the resistance 9 and the capacitance 10 and the other connected to a reference voltage 17 which may be the same as the voltage Vdd. The output of the comparator 16 is connected to the base of the transistor 14.

When both of the switches are open, the voltage Vdd which may, for example, be 5 volts is applied to the series connection between the switch 2, the squib 1 and the igniting transistor 3. Thus the potential of the entire part of that series connection between the safing sensor 2 and the igniting transistor 3 is raised to 5 volts. This 5 volt potential passes through the delay circuit constituted by the resistance 9 and the capacitance 10 to an input of the central processor unit. As long as a potential of 5 volts is received on that input of the central processor unit, the igniting transistor must be in a non-conductive state. Should the igniting transistor undergo any form of failure the potential applied to the lead 8 would fall to earth (ground) potential, and an emergency situation would exist. The central processor unit would be programmed, under such circumstances, to activate the alarm 18 which may be a visible and/or audible alarm and also to apply a sufficient potential to the output 13 to render the controlled current path of the transistor 14 conductive, thus bringing the positive rail 4 to earth and discharging the stabilising capacitor 15. If the safing sensor then becomes conductive, the squib 1 will not receive sufficient current to ignite the gas generator.

On the other hand, if the switch 2 becomes inadvertently jammed in a closed condition or is otherwise rendered permanently conductive, a potential of 12 volts will be applied to that part of the series connection which is on the side of the igniting transistor 3 towards the positive rail. A 12 volt potential will be applied to the lead 8 and will pass through the delay circuit constituted by the resistance 9 and the capacitance 10. Thus, if the central processor unit senses a voltage of 12 volts on its input which is connected to the node between the resistance 9 and the capacitance 10, again the alarm may be activated, and again a potential may be applied to the lead 13 to render the controlled current path of the transistor 14 conductive.

It is to be noted that the node between the resistance 9 and the capacitance 10 is connected to one input of a comparator 16, the other input of which is connected to a reference voltage 17. The output of the comparator is connected directly to the base of the transistor 14 and the arrangement is such that the comparator 16 does not provide an output whilst the voltage Vdd is sensed on the input which is connected to the node between the resistance 9 and the capacitance 10 but if the potential on that input falls to earth, then the comparator provides an output signal which renders the controlled current path of the transistor conductive. A comparator and a reference voltage of the type described will be between 100 and 1,000 more times reliable in activating the transistor 14 than would be the central processing unit alone.

Figure 2A:
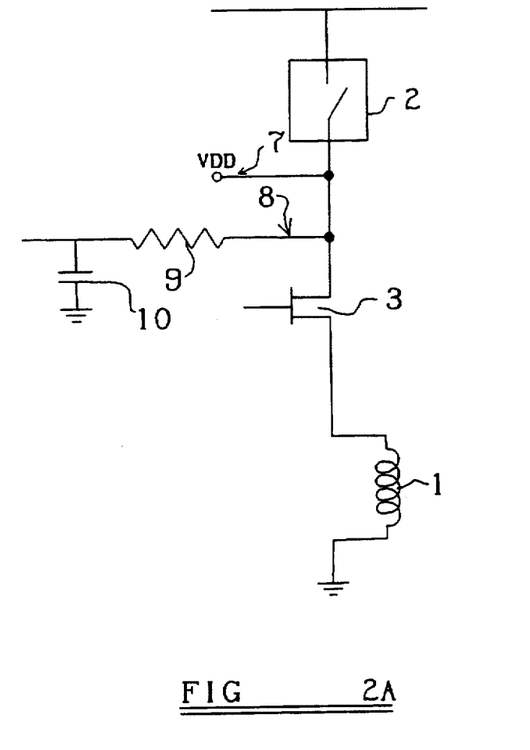
FIGS. 2A and 2B are partial circuit diagrams illustrating modifications that may be effected to the circuit of FIG. 1, FIGS. 3A and 3B are further circuit diagrams illustrating a modified embodiments of the invention.

It is to be appreciated that the series connection between the switches and the squib need not necessarily be in the sequence illustrated in FIG. 1. FIG. 2A illustrates an alternate sequence in which the safing sensor 2 is connected directly to the igniting transistor 3 which in turn is connected to the squib 1 which is connected to earth (ground). In such an embodiment of the invention the potential Vdd may be applied to a node located between the safing sensor 2 and the igniting transistor 3. The lead 8 may also be connected to a point between the safing sensor 2 and the igniting transistor 3. In this arrangement, again a potential equal to Vdd would be expected at the node between the resistance 9 and the capacitance 10. If the potential at this node was seen to fall, it could be concluded that the igniting transistor 3 had become conductive and if the potential rose, it could be concluded that the safing sensor had become conductive.

Figure 2B:
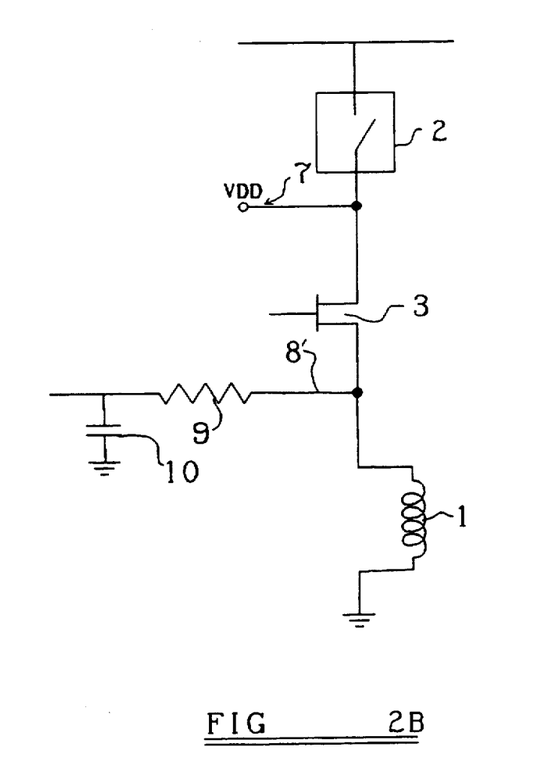

It would be possible, however, in a slight modification, to replace the lead 8 by the lead 8' shown in FIG. 2B which is connected to a point between the igniting transistor 3 and the squib 1. The potential on this lead would be expected to be earth unless the igniting transistor went conductive. If the igniting transistor was conductive, then the potential would be expected to be approximately Vdd. If a lead such as the lead 8' is used a separate sensor lead would have to be provided to sense the condition of the switch 2 if the condition of that switch was indeed to be monitored.

Figure 3A:
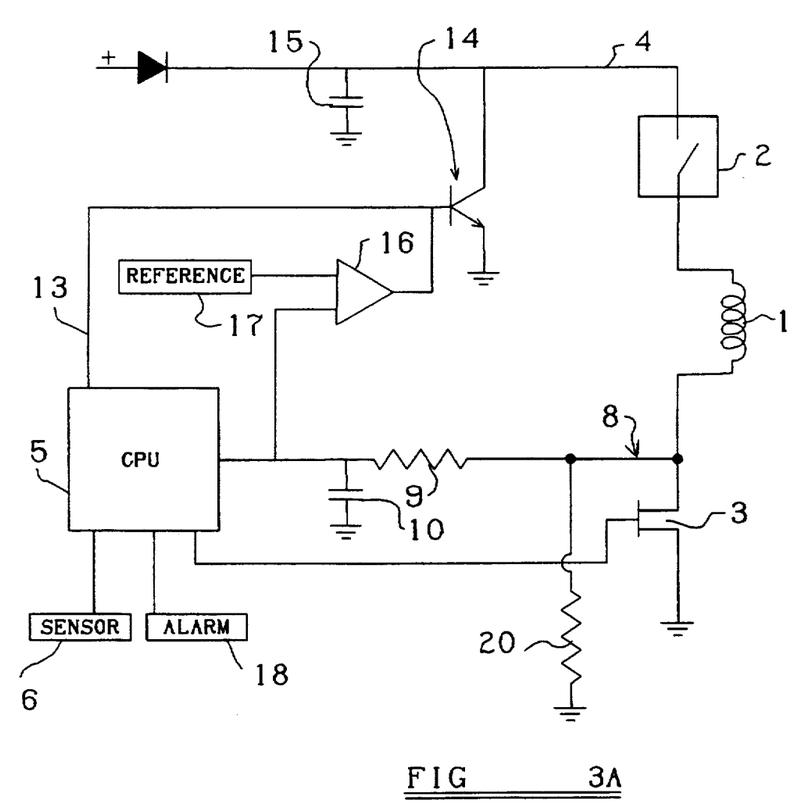
Figure 3B:
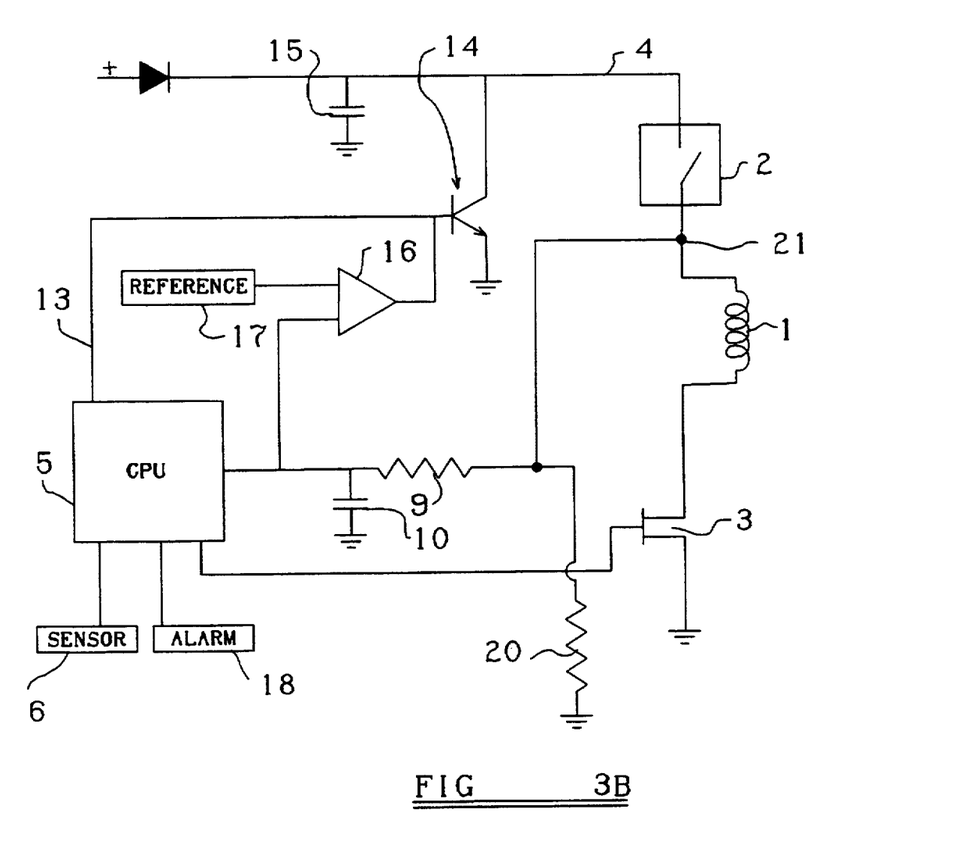

FIG. 3A illustrates an alternative embodiment which incorporates many features which are the same as FIG. 1, these features having the same reference numbers as in FIG. 1 and thus not being re-described. In this embodiment the lead 8 is connected to earth (ground) by means of a high value resistance 20. Thus the potential of the series connection between the safing sensor 2 and the ignition transistor 3 would be expected, in normal circumstances, to be at earth potential. However, if the safing sensor 2 should fail in the conductive state, the potential would rise and the rising of this potential would be sensed by the central processor unit and by the comparator, again causing the transistor 14 to become conductive. The lead 8 may, instead of being connected to a node between the squib 1 and the igniting transistor 3, be connected to a node 21 (as shown in FIG. 3B) between the safing sensor 2 and the squib 1.

Figure 4:
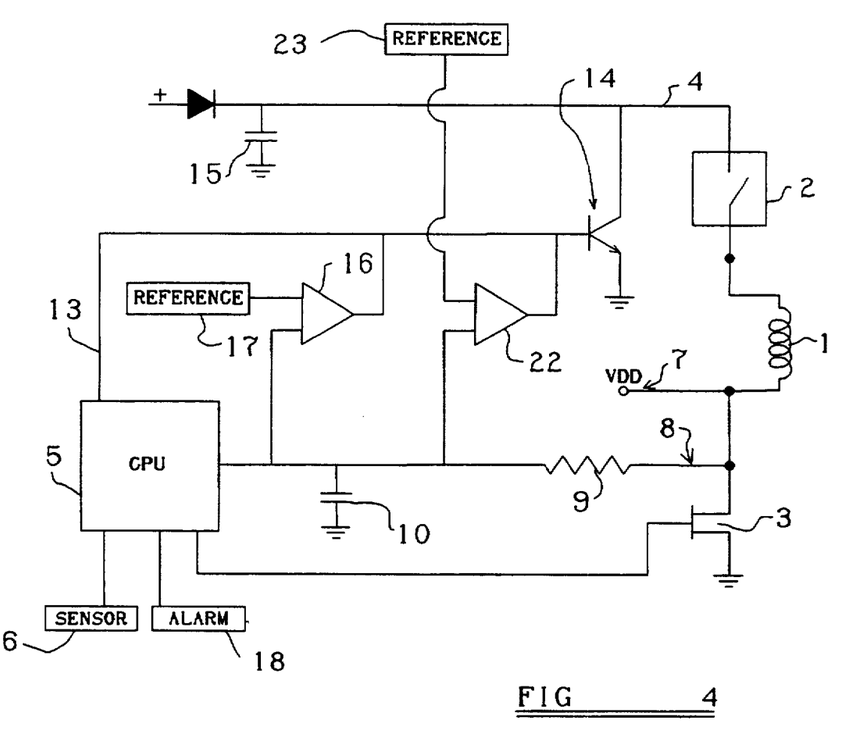
FIG. 4 is another circuit diagram illustrating another modified embodiment of the invention.

FIG. 4 illustrates a modified embodiment of the invention where again many components are the same as in the embodiment of FIG. 1. These embodiments have been given the same reference numerals as in FIG. 1 and will not be re-described. In this embodiment in addition to the comparator 16 which is associated with the reference voltage 17 equivalent to Vdd, a second comparator 22 is provided connected to the node between the resistance 9 and the capacitance 10, this second comparator again having its output connected to the base of the transistor 14 and having its other input connected to a second reference 23 which reference is equivalent to the voltage present on the positive rail 4. Thus, in this embodiment of the invention, whilst the central processor unit will be able to monitor the condition of both the safing sensor 2 and the igniting transistor 3, the first comparator 16 will effectively monitor the condition of the igniting transistor 3, rendering the controlled current path of the transistor 14 conductive in the event that this particular transistor should fail and be in a conductive state, and the second comparator 22 would serve to provide an output should the safing sensor fail in the conductive state, again rendering the controlled current path of the transistor 14 conductive.

It is to be understood that the capacitance 15 is provided to stabilise the potential present on the positive rail 4, but also acts as a reserve energy store. It is possible that, under accident conditions, the battery and the alternator of a motor vehicle may become inoperative or may become disconnected from the circuit that is illustrated. It is thus important that the illustrated circuit should be able to function even without the supply of power. Since the potential is applied to the positive rail through the illustrated diode, even if the battery and alternator of the vehicle become disconnected from the positive rail, an appropriate positive potential will still be on the positive rail, because that potential is stored in the capacitance 15. The capacitance 15 will thus be selected to be large enough to hold a sufficient charge so that when the safing sensor 2 and the ignition transistor 3 are closed, a sufficient current will flow through the squib 1 to activate the air-bag.

Figure 5:
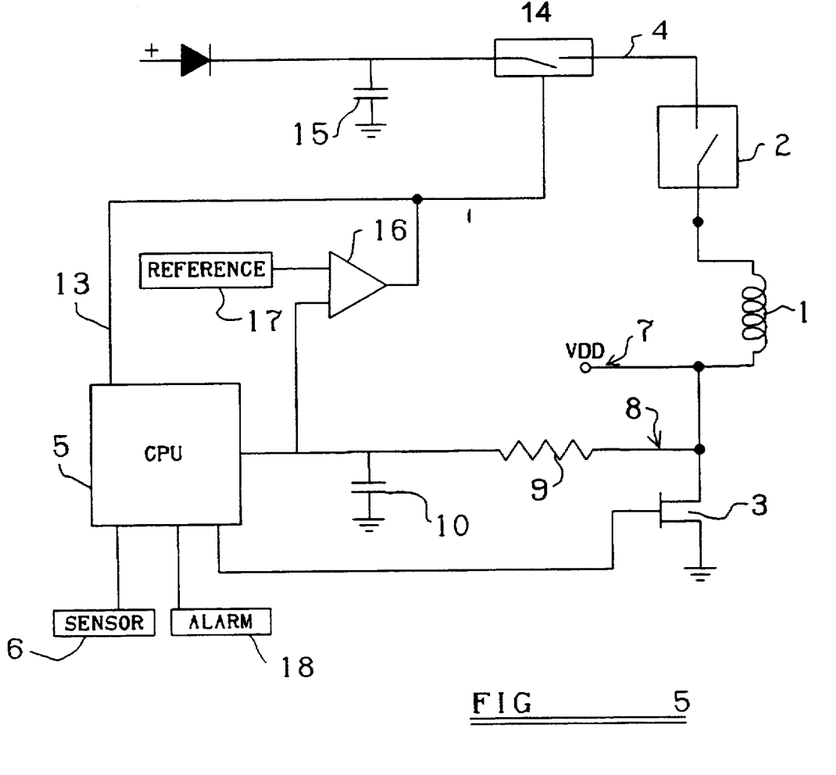
FIG. 5 is another circuit diagram illustrating another modified embodiment of the invention.

Whilst various embodiments of the invention have been described it is to be appreciated that many modifications may be effected, with the various components described above being re-arranged and being slightly modified. For example, while in the described embodiments the power supply is disabled by shorting to earth, in alternative embodiments the power supply may simply be disconnected from the series connection through the squib to earth, or that series connection may be broken as shown in FIG. 5. Thus a normally conductive switch may be rendered nonconducting to achieve the desired result. It is envisaged that these straightforward modifications of the described arrangements will be within the scope of the invention as defined by the following claims.

It is to be appreciated that in the illustrated embodiments of the invention a central processor unit is provided which not only activates the squib under accident conditions, but which also monitors the state of the apparatus. Thus various monitoring leads extend from the central processing unit to various parts of the illustrated circuit. The central processing unit may, in a practical embodiment, also monitor many other different parts of the arrangement, but it is to be understood that the monitoring function performed by the central processing unit is an essential part of the present invention. It has been found that by using a comparator such as the comparator 16 to effect the appropriate comparison, a much greater degree of reliability is obtained than if one utilises a comparing function within the central processing unit. Thus, the central processing unit need not effect any comparing function equivalent to the comparing function performed by the comparator 16.

What is claimed is:

1. An ignition circuit for an air-bag, comprising
a series connection of a first switch, a second switch and an igniting squib for an air-bag, the series connection connected between a potential of a power supply and a potential of a ground;
a disable means, coupled to the power supply, for disabling the power supply;
a first safety device, coupled to a first node in the series connection to derive a first potential from the series connection, for activating the disable means for disabling the power supply when the first potential at the first node is less than a first predetermined potential and is greater than a second predetermined potential; and
a second safety device, comprising a first comparator coupled to a first reference potential and to the first node in the series connection, for activating the disable means for disabling the power supply when the first potential is different from the first reference potential.

2. An ignition circuit according to claim 1, further comprising a delay circuit coupled between the second safety device and the first node.

3. An ignition circuit according to claim 1, further comprising a second reference potential coupled to a second node of the series connection, wherein the second reference potential is less than the potential of the power supply.

4. An ignition circuit according to claim 3, wherein the first and second nodes of the series connection are the same node.

5. An ignition circuit according to claim 3, wherein the first and second nodes of the series connection are different nodes.

6. An ignition circuit according to claim 1, wherein the second safety device further comprises a second comparator coupled to a third reference potential and to the first node in the series connection, for activating the disable means for disabling the power supply when the first potential is greater than the third reference potential, the first comparator activating the disable means when the first switch is conductive and the second comparator activating the disable means when the second switch is conductive.

7. An ignition circuit according to claim 6, wherein the disable means is a transistor having a first terminal coupled to the power supply, a second terminal coupled to the ground and a third terminal coupled to an output of the first safety device, an output of the first comparator and an output of the second comparator.

8. An ignition circuit according to claim 6, wherein the disable means is a switch coupled in series with the series connection, the switch being controlled to be non-conductive when activated by the first safety device, the first comparator or the second comparator.

9. An ignition circuit according to claim 1, wherein the disable means is a transistor having a first terminal coupled to the power supply, a second terminal coupled to the ground and a third terminal coupled to an output of the first safety device and to an output of the first comparator.

10. An ignition circuit according to claim 9, wherein the first safety device is coupled to the third terminal of the transistor of the disable means.

11. An ignition circuit according to claim 1, wherein the disable means is a switch coupled in series with the series connection, the switch being controlled to be nonconductive when activated by the first safety device or the second safety device.

12. An ignition circuit according to claim 1, wherein the first switch is a safing switch and the second switch is an igniting transistor.

* * * * *